US011768917B2

(12) United States Patent
Wang et al.

(10) Patent No.: US 11,768,917 B2
(45) Date of Patent: Sep. 26, 2023

(54) SYSTEMS AND METHODS FOR ALERTING TO MODEL DEGRADATION BASED ON DISTRIBUTION ANALYSIS (71) Applicant: International Business Machines Corporation, Armonk, NY (US)

(72) Inventors: Weichen Wang, Cary, NC (US); Eliza Salkeld, Raleigh, NC (US); Shanna Hayes, Cary, NC (US); Shuyan Lu, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 812 days.

(21) Appl. No.: 16/683,627

(22) Filed: Nov. 14, 2019

(65) Prior Publication Data
US 2021/0150379 A1    May 20, 2021

(51) Int. Cl.
*G06F 18/2415* (2023.01)
*G06N 20/00* (2019.01)
*G06N 5/04* (2023.01)

(52) U.S. Cl.
CPC ........... *G06F 18/2415* (2023.01); *G06N 5/04* (2013.01); *G06N 20/00* (2019.01)

(58) Field of Classification Search
CPC ........ G06N 20/00; G06N 5/04; G06K 9/6277; G06K 9/6215; G06K 9/627; G06F 17/18
See application file for complete search history.

(56) References Cited

U.S. PATENT DOCUMENTS

| 5,539,638 A | 7/1996 | Keeler et al. |
| 7,233,886 B2 | 6/2007 | Wegerich et al. |

(Continued)

FOREIGN PATENT DOCUMENTS

| CN | 103793752 A | 5/2014 |
| CN | 106960358 A | 7/2017 |

(Continued)

OTHER PUBLICATIONS

Nov. 14, 2019, U.S. Appl. No. 16/683,631, 20210150395.

(Continued)

*Primary Examiner* — Margaret G Mastrodonato
(74) *Attorney, Agent, or Firm* — Troutman Pepper Hamilton Sanders LLP (57) ABSTRACT

A detection modeling system performs a distribution analysis to alert to model degradation. The detection modeling system may have a distribution analysis module configured to perform an alerting process in conjunction with a processing device. The distribution analysis module may select, by the processing device, model metrics for analysis, the model metrics being a measure of a parameter associated with the analytical model and determine normal distributions for model metric results for each of the selected model metrics. The detection modeling system may further receive model metric values for each of the selected model metric, compare, by the processing device, the model metric values to the normal distributions for model metric results for each of the received model metric value, and alert, by the processing device, to model degradation of the analytical model based on the comparison of the model metric values to the normal distributions for model metric results.

21 Claims, 8 Drawing Sheets

(56) References Cited

U.S. PATENT DOCUMENTS

| | | | |
|---|---|---|---|
| 7,630,951 | B2 | 12/2009 | Murakami et al. |
| 7,720,662 | B1 | 5/2010 | Aldrich |
| 7,788,195 | B1 | 8/2010 | Subramanian et al. |
| 7,937,350 | B2 | 5/2011 | Lingenfelder et al. |
| 8,179,762 | B2 | 5/2012 | Kaneko et al. |
| 8,214,308 | B2 | 7/2012 | Chu |
| 8,595,156 | B2 | 11/2013 | Bovey et al. |
| 8,775,300 | B2 | 7/2014 | Showalter |
| 9,336,494 | B1 | 5/2016 | Purpura et al. |
| 9,449,344 | B2 | 9/2016 | Deshpande et al. |
| 9,632,904 | B1 | 4/2017 | Erikson et al. |
| 10,963,325 | B2 | 3/2021 | Coutinho et al. |
| 11,153,338 | B2 | 10/2021 | Feezell et al. |
| 2003/0200189 | A1 | 10/2003 | Meng et al. |
| 2004/0177030 | A1 | 9/2004 | Shoham |
| 2007/0143827 | A1 | 6/2007 | Nicodemus et al. |
| 2007/0143851 | A1 | 6/2007 | Nicodemus et al. |
| 2008/0195650 | A1 | 8/2008 | Lingenfelder et al. |
| 2010/0094785 | A1 | 4/2010 | Kuroiwa et al. |
| 2011/0130850 | A1 | 6/2011 | Zheng et al. |
| 2012/0216200 | A1 | 8/2012 | Vaidyanathan et al. |
| 2014/0149273 | A1 | 5/2014 | Angell et al. |
| 2014/0365271 | A1 | 12/2014 | Smiley et al. |
| 2015/0355901 | A1* | 12/2015 | Bonissone .............. G06F 8/70 717/120 |
| 2015/0363693 | A1* | 12/2015 | Caplan ................ G06N 5/022 706/46 |
| 2016/0155136 | A1 | 6/2016 | Zhang et al. |
| 2016/0162346 | A1* | 6/2016 | Kushnir ............. G06F 11/079 714/37 |
| 2016/0191970 | A1 | 6/2016 | Sheppard |
| 2016/0283861 | A1 | 9/2016 | Gerard |
| 2016/0321561 | A1 | 11/2016 | Roder et al. |
| 2017/0257653 | A1 | 9/2017 | Farré Guiu et al. |
| 2017/0262818 | A1 | 9/2017 | Horrell et al. |
| 2017/0372224 | A1 | 12/2017 | Reimann |
| 2018/0032038 | A1 | 2/2018 | Kang et al. |
| 2018/0032903 | A1 | 2/2018 | Barry et al. |
| 2018/0052907 | A1 | 2/2018 | Greifeneder et al. |
| 2018/0124097 | A1 | 5/2018 | Tiwari et al. |
| 2018/0197087 | A1 | 7/2018 | Luo et al. |
| 2018/0277246 | A1 | 9/2018 | Zhong et al. |
| 2018/0285772 | A1 | 10/2018 | Gopalan |
| 2018/0322411 | A1 | 11/2018 | Wang |
| 2019/0026754 | A1 | 1/2019 | Miltonberger |
| 2019/0102361 | A1 | 4/2019 | Muralidharan et al. |
| 2019/0286096 | A1* | 9/2019 | Kawanoue ......... G05B 23/0254 |
| 2019/0317788 | A1 | 10/2019 | Lang et al. |
| 2019/0362072 | A1 | 11/2019 | Kesarwani et al. |
| 2020/0064444 | A1 | 2/2020 | Regani et al. |
| 2020/0090070 | A1 | 3/2020 | Bhattacharyya et al. |
| 2020/0160207 | A1 | 5/2020 | Song et al. |
| 2020/0234162 | A1* | 7/2020 | Jayaraman ............. G06N 20/00 |
| 2020/0314101 | A1 | 10/2020 | Zhang et al. |
| 2020/0364618 | A1* | 11/2020 | Peh ....................... G06N 20/00 |
| 2020/0410390 | A1 | 12/2020 | Fu et al. |
| 2021/0073627 | A1 | 3/2021 | Sarferaz |
| 2021/0133632 | A1 | 5/2021 | Elprin et al. |
| 2021/0150395 | A1 | 5/2021 | Wang et al. |
| 2021/0241141 | A1 | 8/2021 | Dugger et al. |
| 2022/0035892 | A1* | 2/2022 | You ........................ G06F 40/30 |
| 2022/0129791 | A1* | 4/2022 | Nia ..................... G06F 18/2414 |
| 2022/0222581 | A1* | 7/2022 | Okawa ................... G06K 9/628 |

FOREIGN PATENT DOCUMENTS

| | | |
|---|---|---|
| CN | 107766628 A | 3/2018 |
| CN | 108629183 A | 10/2018 |
| CN | 110334544 A | 10/2019 |
| GB | 2440631 A | 2/2008 |

OTHER PUBLICATIONS

Nov. 14, 2019, U.S. Appl. No. 16/683,627, 20210150379.

Nov. 14, 2019, U.S. Appl. No. 16/683,634, 20210150394.

Nov. 14, 2019, U.S. Appl. No. 16/683,636, U.S. Pat. No. 11,256,597 / 20210149786.

Nov. 14, 2019, U.S. Appl. No. 16/683,639, 20210150397.

Non-Final Office Action dated Jun. 24, 2021 in related U.S. Appl. No. 16/683,636.

Non-Final Office Action dated Sep. 15, 2021 in related U.S. Appl. No. 16/683,633.

Cerquitelli et al. "Towards a real-time unsupervised estimation of predictive model degradation", Aug. 26, 2019 https://dl.acm.org/doi/abs/10.1145/3350489.3350494 (Year: 2019).

Wei Zhang, Martin Hirzel, and David Grove, "AQuA: adaptive quality analytics," Proceedings of the 10th ACM International Conference on Distributed and Event-based Systems (DEBS '16). ACM, New York, NY, USA, 169-180.

Anonymous, "Identifying and Determining Trustworthiness of a Machine-Learned Model," Jan. 5, 2018,Database: IP.COM; IP.COM No. IPCOM000252359D.

Xia et al., "Multiple model failure detection based on wavelet neural network," Journal of Nanjing Univ. of Aeronautics & Astronautics, vol. 35, No. 4. pp. 366-9; 2003 (English Abstract Only).

International Search Report and Written Opinion dated Jan. 27, 2021 in related International Patent Application Serial No. PCT/IB2020/059564.

Sethi et al. "On the reliable detection of concept drift from streaming unlabeled data", Oct. 2017 https://www.sciencedirect.com/science/article/pii/S0957 417 417302439 (Year: 2017).

International Search Report and Written Opinion dated Jan. 27, 2022 in related International Application PCT/IB2020/059643.

Cerquitelli et al. "Automating concept-drift detection by self-evaluating predictive model degradation", Jul. 2019 https://arxiv.org/pdf/1907.08120.pdf (Year: 2019).

Liu, C., White, M. and Newell, G. (2011), Measuring and comparing the accuracy of species distribution models with presence-absence data. Ecography, 34: 232-243. https://doi.org/10.1111/j.1600-0587.2010.06354.x (Year: 2001).

* cited by examiner

SYSTEMS AND METHODS FOR ALERTING TO MODEL DEGRADATION BASED ON DISTRIBUTION ANALYSIS

TECHNICAL FIELD

The present application generally relates to systems for assessing the health of an analytical model, and, in particular, to systems and methods to alerting to model degradation based on a distribution analysis of model metrics.

BACKGROUND

Analytical models for event detection are important to a range of fields and industries. For example, various analytical models are used to detect banking fraud, aid in regulatory compliance, and many other complex, data-driven problems. Many fields require the most up-to-date models for accurate and timely event detection. In some fields, for example, many types of fraud, a third party agent is actively working to escape detection by current analytical models. One aspect of detection modeling is determining when a model has degraded and should be replaced or updated.

SUMMARY

According to some embodiments, the present disclosure describes a computer-implemented method for performing entity resolution. The method includes performing steps by a processing device, including selecting model metrics for analysis. The model metrics are a measure of a parameter associated with the analytical model. The method also includes determining normal distributions for model metric results for each of the selected model metrics, and receiving model metric values for each of the selected model metrics. The method further includes comparing the model metric values to the normal distributions for model metric results for each of the received model metric values, and alerting to model degradation of the analytical model based on the comparison of the model metric values to the normal distributions for model metric results.

According to other embodiments, the present disclosure describes an detection modeling system. The detection modeling system may include a processing device, a memory, and a distribution analysis module. The distribution analysis module may select, by the processing device, model metrics for analysis, the model metrics being a measure of a parameter associated with the analytical model and determine normal distributions for model metric results for each of the selected model metrics. The detection modeling system may further receive model metric values for each of the selected model metric, compare, by the processing device, the model metric values to the normal distributions for model metric results for each of the received model metric value, and alert, by the processing device, to model degradation of the analytical model based on the comparison of the model metric values to the normal distributions for model metric results.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present disclosure are best understood from the following detailed description when read in connection with the accompanying drawings. For the purpose of illustrating the disclosure, there is shown in the drawings embodiments that are presently preferred, it being understood, however, that the disclosure is not limited to the specific embodiments disclosed.

DETAILED DESCRIPTION OF ILLUSTRATIVE EMBODIMENTS

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™ Smalltalk, C++ or the like, and conventional procedural programming languages, such as the "C" programming language or similar programming languages. The computer readable program instructions may execute entirely on the user's computer, partly on the user's computer, as a stand-along software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice, memorization and recall)
- Predict and sense with situation awareness that mimics human cognition based on experiences
- Answer questions based on natural language and specific evidence Embodiments herein relate to a system for determining when an analytical model has degraded and should be replaced. As used herein, an individual "local node" refers to software installed by an end user, such as an individual person or a corporation, and/or associated hardware components configured to execute the software. In some embodiments the local node comprises one computer system. In some embodiments, the local node comprises multiple computer systems or servers controlled by the end user. In some embodiments, each local node in the system uses a set of current analytical models that are specific to that local node. In some embodiments, each local node in the system accesses and analyzes system data produced by one or more analytical models. This system data is specific to each local node, and may comprise sensitive or confidential information.

As used herein, an individual "detection model," "analytical model," or just "model" is a software algorithm designed to detect certain events using data analysis techniques. In some embodiments, the analytical models detect data anomalies. In some embodiments, the analytical models detect fraud events. In some embodiments, the data analysis techniques used by the analytical models include, but are not limited to, data preprocessing techniques, calculation of one or more statistical parameters, statistical ratios based on classifications or groups, calculation of probabilities, classification techniques such as data clustering and data matching, regression analysis, and gap analysis. In some embodiments, the software of the local node comprises one or more analytical models. In some embodiments, the software of the local node comprises one or more analytical models and deterministic rules. In some embodiments, the software of the local node comprises one or more analytical models for fraud detection. In some embodiments, the software of the local node comprises one or more analytical models for regulatory compliance or non-compliance. In some embodiments, the software of the local node comprises one or more models and deterministic rules for fraud detection. In some embodiments, the software of the local node comprises one or more models and deterministic rules for regulatory compliance or non-compliance.

In some embodiments, the update system, including any local nodes, is a stand-alone system that creates and pushes model updates for any software system that uses analysis models. In some embodiments, the update system is itself a component or subsystem of a larger analytical system, for example, an analytical system for fraud detection.

Figure 1:
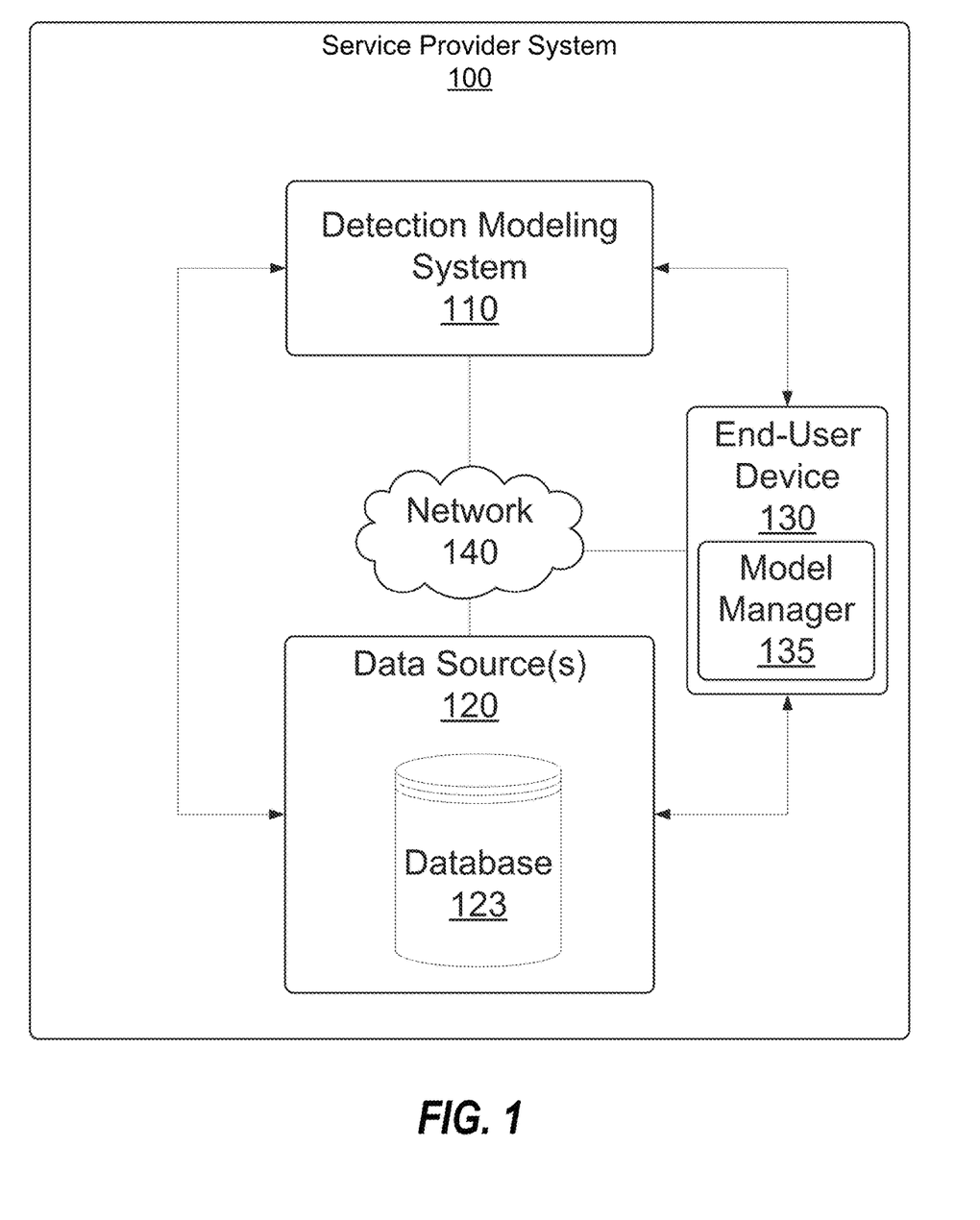
FIG. 1 depicts a block diagram of an exemplary service provider system.

FIG. 1 is an illustration of an exemplary service provider system 100. The service provider system 100 may include a detection modeling system 110, one or more data sources 120, and an end-user device 130. A network 140 may connect the detection modeling system 110, the one or more data sources 120, and/or the end-user device 130.

The detection modeling system 110 may be a computing device, such as a back-end server. The detection modeling system 110 may include components that enable data analysis functions and practical applications thereof, such as the implementation of model degradation detection for determining when a detection model should be replaced.

The one or more data sources 120 may be computing devices and/or storage devices configured to supply data to the detection modeling system 110. In one example, the one or more data sources 120 comprise a database 123, which may be populated with data upon which one or more detection models is operated.

The end-user device 130 may be a computing device (e.g., a desktop or laptop computer, mobile device, etc.). The end-user device 130 may communicate with the detection modeling system 110 to receive information and provide feedback related to the use and implementation of detection models. In some embodiments, the end-user device 130 may include a model manager 135 configured to receive, generate, deploy, or otherwise operate a detection model, such as a fraud detection model targeted at customer data stored from the one or more data source(s) 120.

The network 140 may be a local or global network and may include wired and/or wireless components and functionality which enable internal and/or external communication for components of the service provider system 100. The network 140 may be embodied by the Internet, provided at least in part via cloud services, and/or may include one or more communication devices or systems which enable data transfer to and from the systems and components of the service provider system 100.

In accordance with some exemplary embodiments, the detection modeling system 110, data source(s) 120, end-user device 130, or the related components include logic implemented in specialized hardware, software executed on hardware, or any combination of specialized hardware and software executed on hardware, for implementing the service provider system 100 or related components. In some exemplary embodiments, the detection modeling system 110 or any of its components may be or include the IBM Watson™ system available from International Business Machines Corporation of Armonk, N.Y., which is augmented with the mechanisms of the illustrative embodiments described hereafter.

Figure 2:
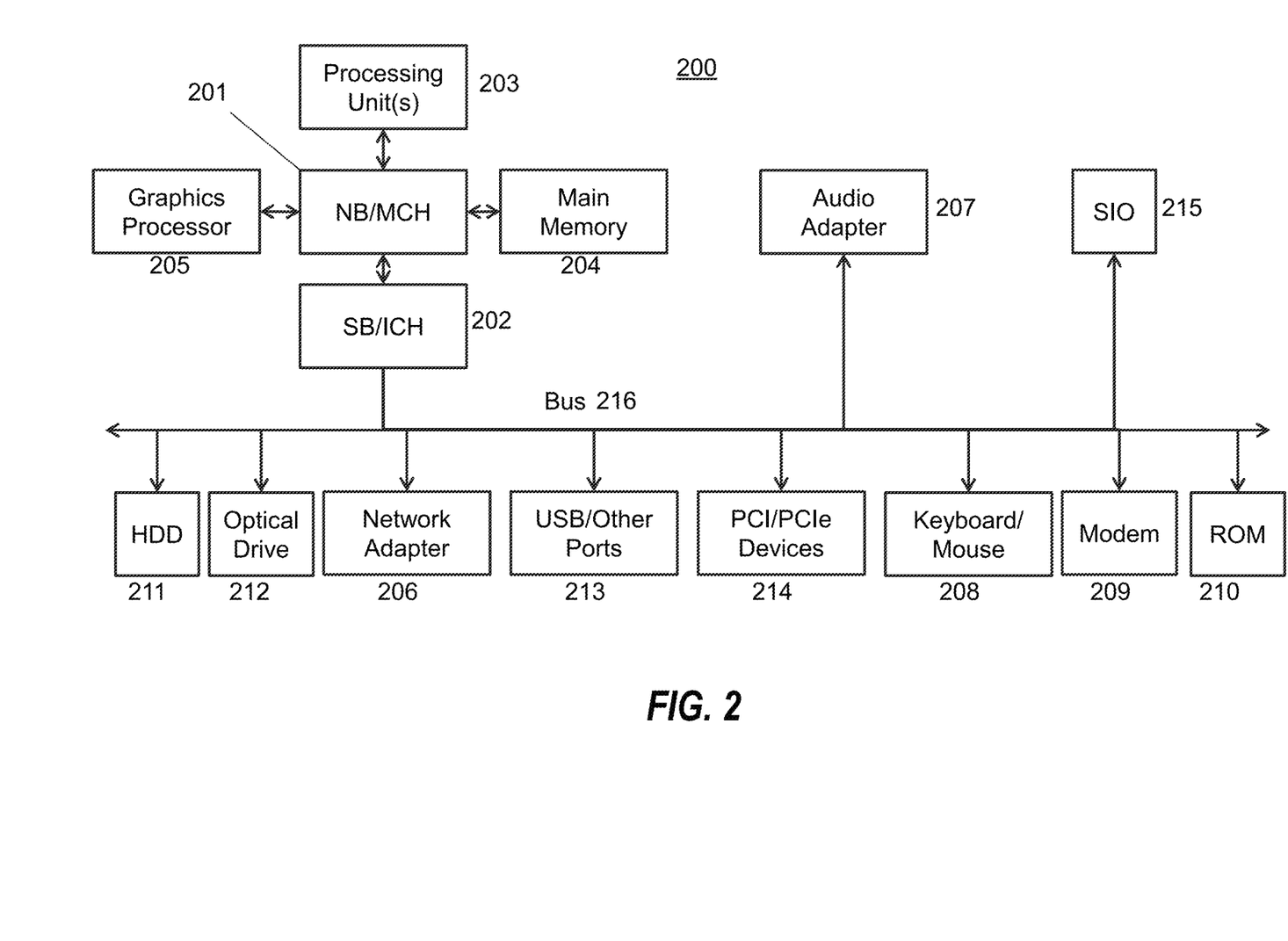
FIG. 2 depicts a block diagram of an example data processing system in which aspect of the illustrative embodiments may be implemented.

FIG. 2 is a block diagram of an example data processing system 200 in which aspects of the illustrative embodiments are implemented. Data processing system 200 is an example of a computer in which computer usable code or instructions implementing the process for illustrative embodiments of the present invention are located. In one embodiment, FIG.

2 represents the detection modeling system 110, which implements at least some of the aspects of the service provider system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java' programming system, may run in conjunction with the operating system and provide calls to the operating system from the object-oriented programs or applications executing on the data processing system 200. As a server, the data processing system 200 can be an IBM® eServer™ System P® running the Advanced Interactive Executive operating system or the LINUX® operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the website navigation system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the data processing system 200 includes several components which would not be directly included in some embodiments of the detection modeling system 110. However, it should be understood that a detection modeling system 110 may include one or more of the components and configurations of the data processing system 200 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
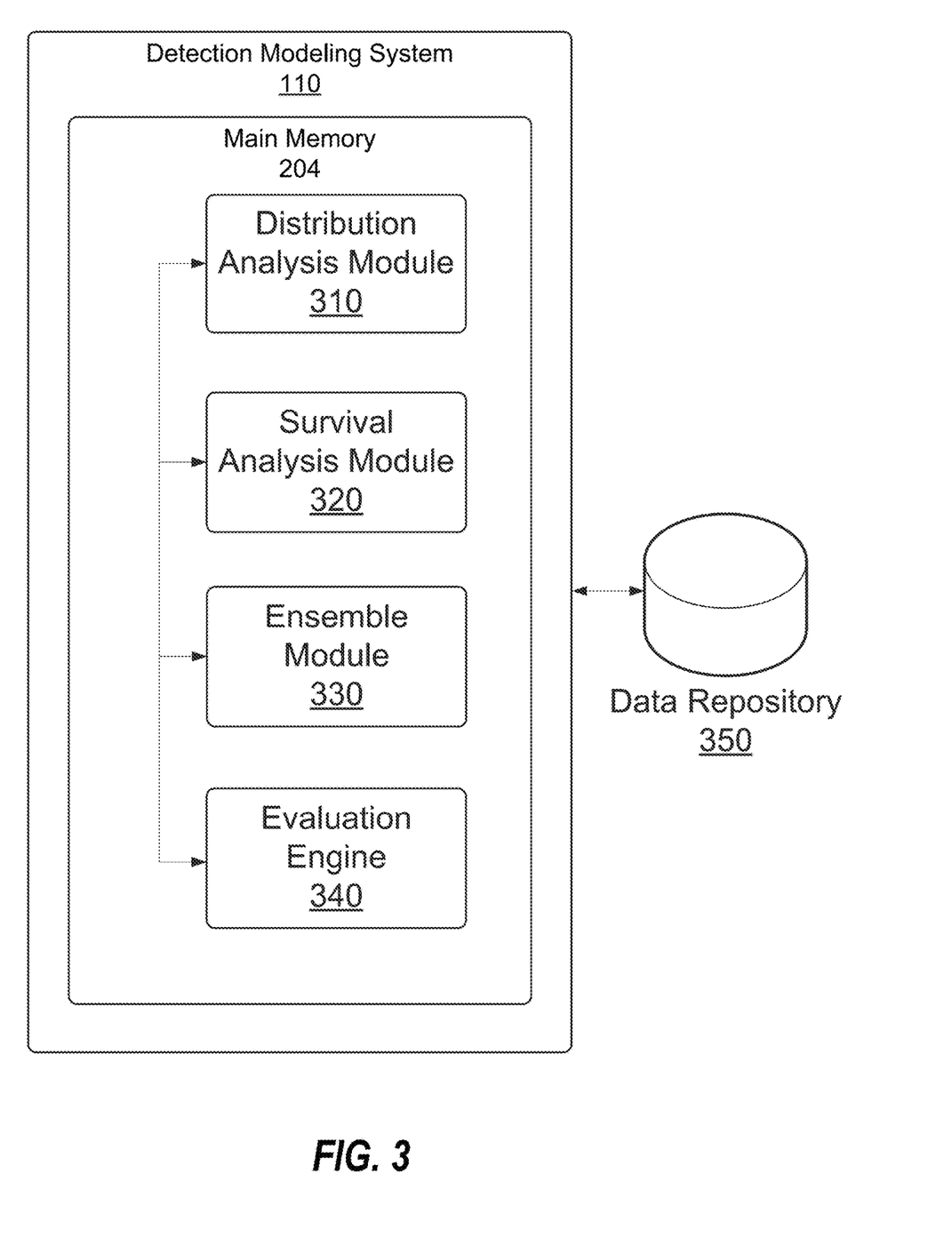
FIG. 3 depicts a block diagram of an exemplary detection modeling system.

FIG. 3 illustrates an exemplary embodiment of the detection modeling system 110. In an exemplary embodiment, the detection modeling system 110 includes a distribution analysis module 310, a survival analysis module 320, an ensemble module 330, and an evaluation engine 340. These subsystems of the detection modeling system 110 may be components of a single device, or may be separated devices connected to each other (e.g., via the network 140). In some embodiments, the detection modeling system 110 may further include and/or be connected to one or more data repositories 350.

The distribution analysis module 310 may be a hardware and/or software system configured to perform a distribution analysis in order to detect degradation of an analytical model based on one or more model metrics. The survival analysis module 320 may be a hardware and/or software system configured to perform a survival analysis in order to detect degradation of an analytical model based on statistical analysis of similar models. The ensemble module 330 may be a hardware and/or software system configured to use output of both the distribution analysis module 310 and the survival analysis module 320 to evaluate a detection model. The evaluation engine 340 is configured to use output of the distribution analysis module 310, the survival analysis module 320, and/or ensemble module 330 to improve the respective modules based on feedback from output results.

In an exemplary embodiment, the distribution analysis module 310 is configured to perform statistical analysis in relation to input data for one or more analytical models. For example, the distribution analysis module 310 may be configured to calculate one or more health metrics in relation to an analytical model. Examples of metrics include sensitivity metrics, accuracy metrics, longevity metrics, specificity, etc. More particularly, examples of metrics include Logarithmic Loss, True Positive Rate (Sensitivity), False Positive Rate, True Negative Rate (Specificity), F1 Score, Precision, Recall, Mean Absolute Error, Mean Squared Error, etc. The distribution analysis module 310 is further configured to use the results of metric measurements across multiple different analytical models to create a distribution, such as the approximate normal distribution 400 illustrated in FIG. 4. The distribution 400 represents a range of metric results for a given metric. The distribution 400 indicates a degree to which a metric is acceptable in comparison to other analytical models. For example, the distribution 400 may represent a distribution of sensitivity metrics measured across multiple analytical models across at different stages of health and lifespan.

Figure 4:
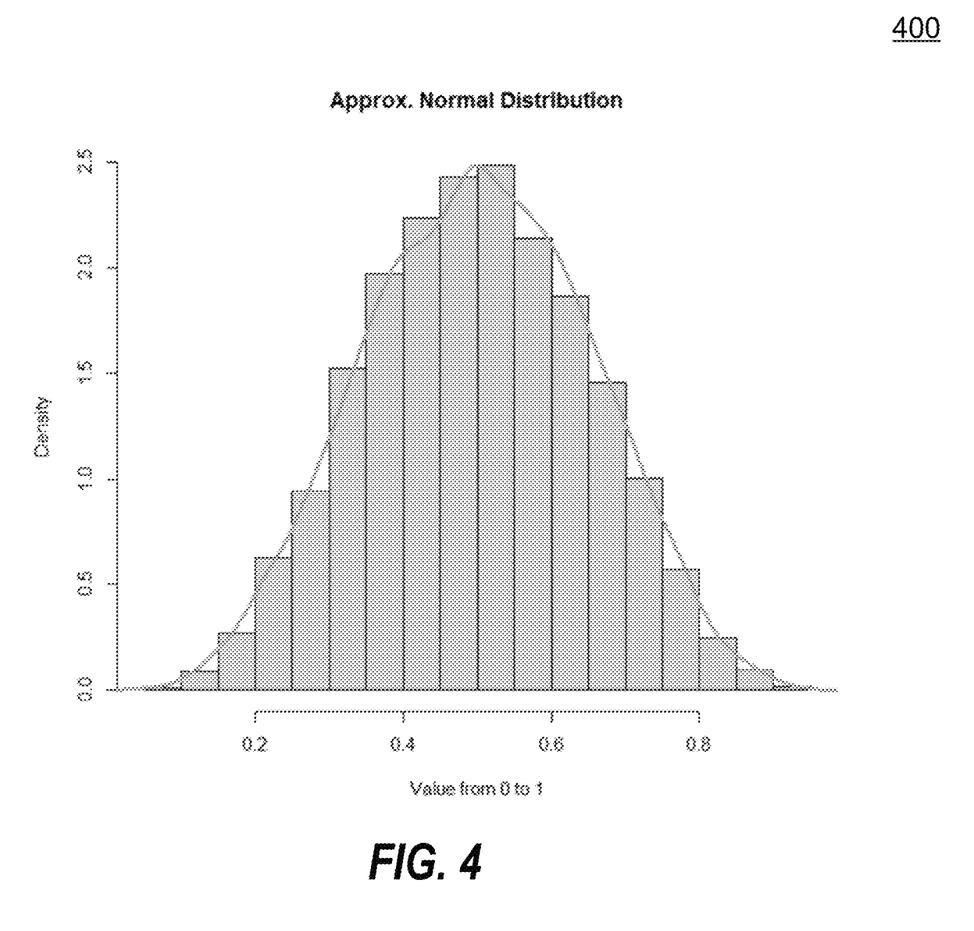
FIG. 4 depicts a normal distribution of a model metric that may be used in evaluating an analytical model through distribution analysis.

The distribution analysis module 310 is further configured to use data and a distribution of a metric to determine a health value of an analytical model based on the location of the metric result on the distribution. For instance, if the distribution 400 represents a sensitivity metric, the distribution analysis module 310 is configured to determine a level of sensitivity deviation (e.g., number of standard deviations in relation to the distribution 400) that is acceptable for an analytical model to be relied upon in use. In another example, the distribution analysis module 310 is configured to The distribution analysis module 310 is configured to transmit results to the evaluation engine 340 for use in evaluating current analytical models with input from one or more data sources and/or users.

The survival analysis module 320 is configured to use survival analysis as an additional or alternative tool to measure the performance of an analytical model. The survival analysis module 320 may be configured to determine, for example, given the time since a model was trained, the probability that it does not need to be retrained at this time. Conversely, the survival analysis module 320 may be configured to determine, given the time since a model was trained, the probability that it fails (does required retraining). Another function of the survival analysis module 320 may be to determine a time stamp at which the probability of a model needing to be retrained is 50%.

Figure 5:
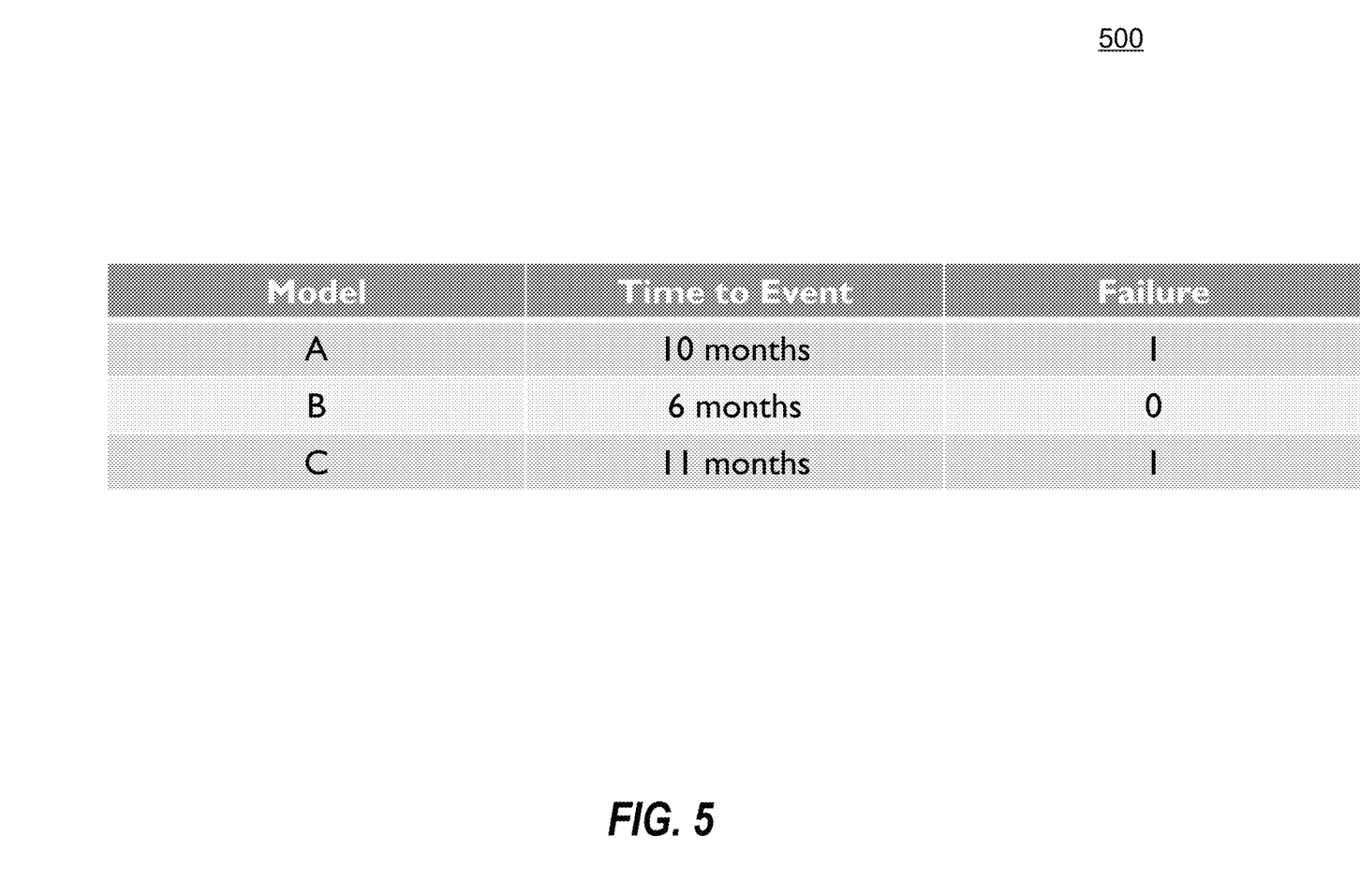
FIG. 5 depicts a survival analysis table that may be used in evaluating an analytical model through survival analysis.

The survival analysis module 320 may be configured to use information from the distribution analysis module 310 to perform a survival analysis. For instance, the distribution analysis module 310 may be used to determine when a model "fails." The survival analysis module 320 may then use a time from training to "failure" (based on the distribution analysis module) to determine a "half-life" or expected lifetime of a model. The survival analysis module 320 may be configured to calculate metrics such as a Kaplan Meier Estimate, produce a survival curve, a hazard curve, and calculate a half-life (e.g., the probability of survival is 0.5. FIG. 5 is an example of a survival matrix that may be tracked by the survival analysis module 320 to determine a time to event and failure status of one or more analytical models (e.g., models A-C) for use in performing a survival analysis.

Figure 6:
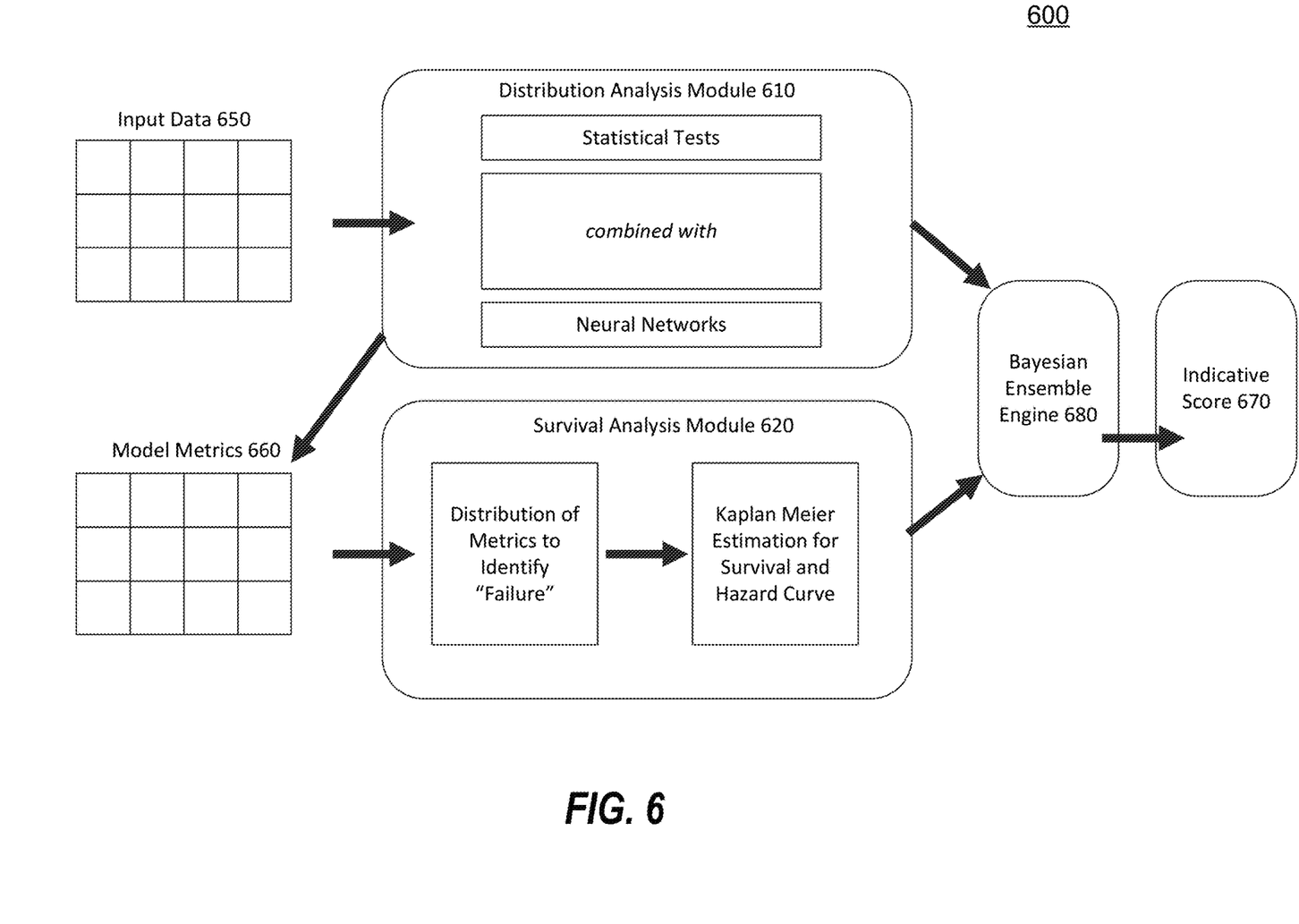
FIG. 6 depicts a visual flow through an ensemble approach to evaluating an analytical model.

The ensemble module 330 may be configured to combine results of the distribution analysis module 310 and survival analysis module 320 to utilize a combined approach for assessing the health of an analytical model. FIG. 6 is a visual flow diagram of a combined approach that may be executed by the ensemble module 330 (in combination with the distribution analysis module 310 and the survival analysis module 320 in some embodiments). In some embodiments, the ensemble module 330 comprises a distribution analysis module 610 (which may the same or similar to the distribution analysis module 310) and a survival analysis module 620 (which may be the same or similar to the survival analysis module 320).

The ensemble module 330 is configured to use input data 650 and model metrics 660 to calculate an indicative score 670. The input data 650 may include customer data and/or transaction data including behavioral statistics and demographical information. The distribution analysis module 610 may receive the input data 650 and use statistical tests combined with neural networks to determine an expected failure model based on the analysis of model metrics produced by the statistical tests. The model metrics 660 may be the results of the statistical tests performed by the distribution analysis module 610. These metrics 660 may be fed to the survival analysis module 620 for a survival analysis. For example, the metrics 660 may comprise a distribution of metrics that identify a "time to failure" for a particular model or a certain type, class, or category of analytical model. In some embodiments, the distribution analysis module 610 may perform statistical hypothesis testing to obtain a result regarding whether an input data distribution has changed to some degree.

The ensemble module 330 may further comprise a Bayesian ensemble engine 680 that receives results of the distribution analysis module 610 and the survival analysis module 620 and combines the results to produce the indicative score 670. For example, the Bayesian ensemble engine 680 may calculate a score ranging from 0 to 1 to indicate the health of an analytical model (e.g., the likelihood that the model needs to be retrained) based on the results of the distribution analysis and survival analysis. In some embodiments, the Bayesian ensemble engine 680 may use a weighted approach to the outputs of the distribution analysis and survival analysis. In other embodiments, the Bayesian ensemble engine 680 may use a majority vote, average weighting, or stacking of outputs to calculate the indicative score 670. The indicative score 670 may be used to determine whether a model should be retrained.

Disclosed embodiments provide several systems and methods for assessing the health of an analytical model, such as a detection model for identifying fraudulent behavior in a data set from a financial institution. The health of the analytical model may be a measure of the likelihood that the model should be retrained. These options include distribution analysis, survival analysis, and an ensemble approach using both distribution and survival analysis.

Consistent with disclosed embodiments, the service provider system 100 may implement an interactive program that allows a user to customize alerts that are delivered based on the results of a disclosed method for assessing an analytical model. For instance, a financial institution may provide a risk tolerance value based on a degree to which the institution is willing to risk using outdated analytical models. The service provider system 100 may be configured to translate the risk tolerance value into a threshold that is used to determine whether an output of a health assessment of a model indicates that the model should be replaced/retrained.

Figure 7:
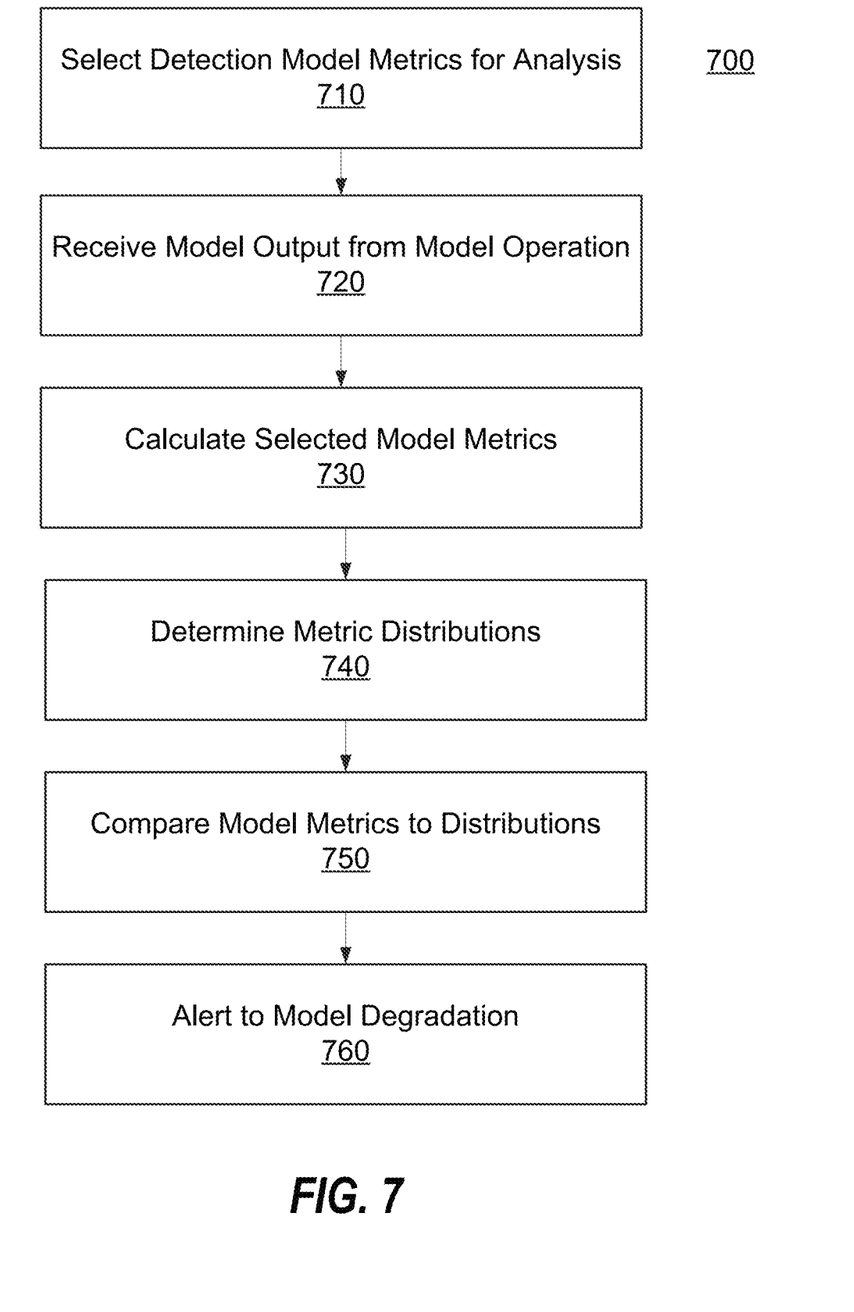
FIG. 7 depicts a flowchart of an exemplary process for alerting to model degradation based on a distribution analysis.

FIG. 7 is a flowchart of an exemplary process 700 for alerting to model degradation based on a distribution analysis of model metrics. The detection modeling system 110 may perform one or more steps of process 700. For example, the distribution analysis module 310 may perform process 700 to detect when a model is degraded and should be replaced. In some embodiments, the distribution analysis module 610 may perform one or more steps of the process 700 as part of an ensemble approach.

In step 710, the distribution analysis module 310 may select model metrics to be included in a distribution analysis. These model metrics may include, for example, sensitivity metrics, accuracy metrics, age metrics, etc. In some embodiments, a user may select model metrics or the model metrics may be automatically selected based on a user profile or a type of model to be assessed.

In step 720, the distribution analysis module 310 may receive model output from model operation. For example, the model manager 135 at the end-user device 130 may operate an analytical model (e.g., a fraud model for a financial institution) based on data from the data source(s) 120 and provide results to the detection modeling system 110 where it is received by the distribution analysis module 310. In step 730, the distribution analysis module 310 calculates model metric results based on the selected model metrics and the model output from model operation. In some embodiments, the distribution analysis module 310 receives the model metrics from the end-user device 130 after metric determination by the end-user device 130. In other words, the output received by the distribution analysis module 310 in step 720 may be the calculated metrics of step 730.

In step 740, the distribution analysis module 310 determines or otherwise obtains a metric distribution related to each selected model metric. For example, for each selected model metric, the distribution analysis module 310 determines a normal distribution of metric values similar to the distribution curve 400 shown in FIG. 4. The distribution analysis module 310 may determine the metric distribution by tracking the metric over a period of time and normalizing the results, if necessary. In some embodiments, the metric distribution may be based on historical output of an analytical model or a type, category, or class of analytical models for a particular metric. In some embodiments, the metric distribution may require a threshold number of data points before it can be considered a sufficient sample size for use in disclosed alerting methods.

In step 750, the distribution analysis module 310 is configured to compare new model metric results to the determined metric distributions. For example, the distribution analysis module 310 may receive a sensitivity rating for an analytical model configured to detect fraudulent behavior. The distribution analysis module 310 may determine where the sensitivity rating falls within an associated normal distribution for sensitivity ratings of similarly-situated fraud detection models. For example, the distribution analysis module 310 may calculate a standard deviation from the mean value of the distribution for the given sensitivity rating.

In step 760, the distribution analysis module 310 is configured to alert to model degradation. For example, the distribution analysis module 310 may be configured to flag "events" that indicate that an obtained metric value is outside of an acceptable range when compared to normal distributions for those metrics. In the example given, the distribution analysis module 310 may compare the standard deviation of the sensitivity rating to determine whether the deviation is acceptable. For example, the distribution analysis module 310 may compare the deviation to a threshold and alert to any metric values received that exceed acceptable values. The distribution analysis module 310 may be configured to provide an alert to the end-user device 130 to flag "events" indicating that a particular analytical model may require retraining due to degradation over time.

In some embodiments, flagged "events" may be used to assess model degradation based on stored criteria. For example, a certain number of events may indicate that a model has degraded to the point of needing retraining. In some embodiments, the distribution analysis module 310 may use a model degradation equation that utilizes flagged "events" to determine a likelihood that a model should be retrained or replaced, and alert the end-user device 130 or other component of service provider system 100.

The disclosed method 700 for alerting to degradation based on distribution analysis provides an approach to determining when analytical model has degraded (e.g., because it is no longer achieving its purpose with sufficient regularity) based on model metrics. Over time, these model metrics provide information that relates to how one could expect a healthy model to operate. By comparing new metric values to a normal distribution, the detection modeling system 110 can determine when a model may need to be retrained or replaced. As a result, service providers and customers can more easily rely on the output of analytical models and have confidence that they are replaced or retrained as needed.

Figure 8:
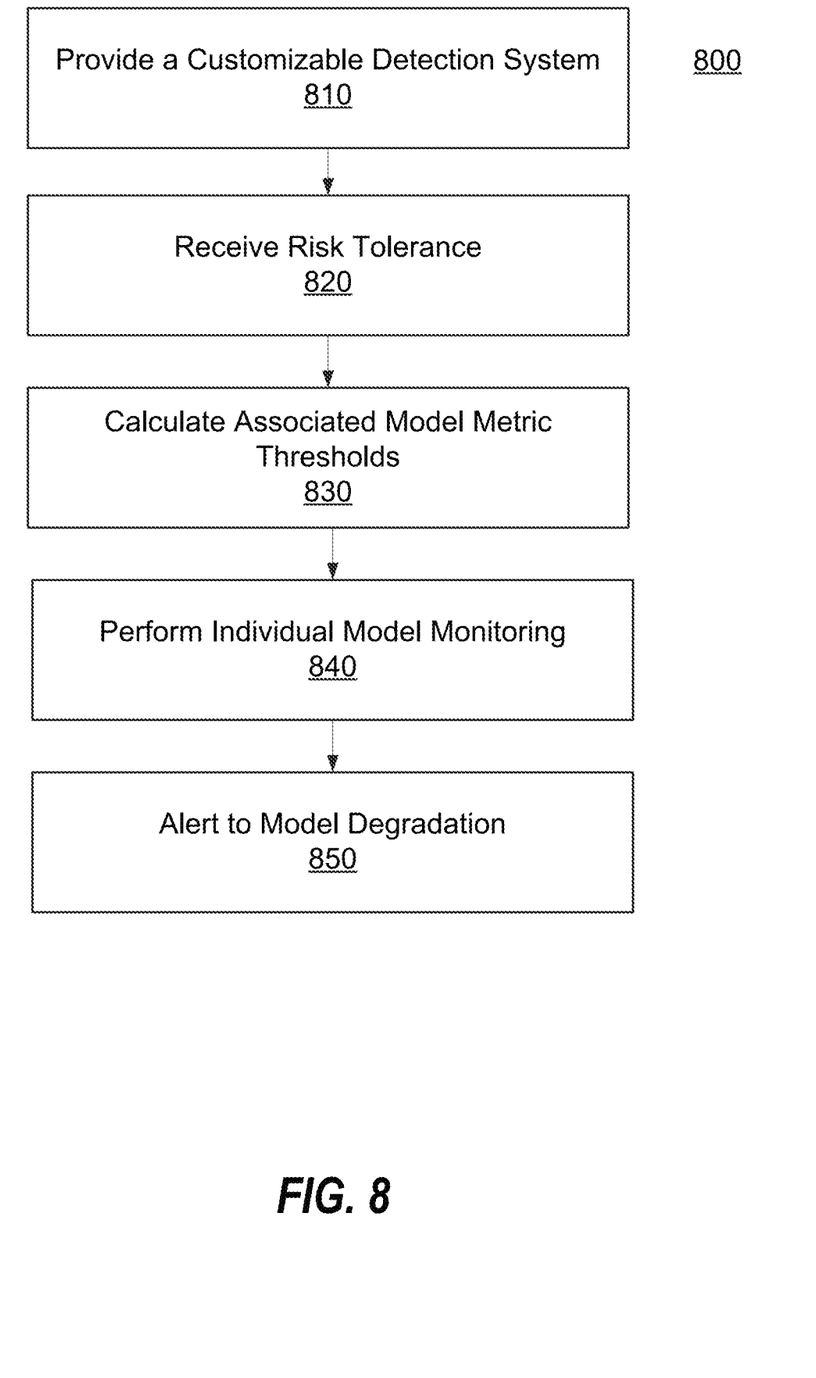
FIG. 8 depicts a flowchart of another exemplary process for alerting to model degradation based on a distribution analysis.

Further, disclosed embodiments may apply customizable thresholds to a distribution analysis to tailor a model degradation analysis to the particular risk profile of a service provider, customer, model, etc. FIG. 8 is a flowchart of an exemplary process 800 for alerting to model degradation based on such tailored information. Distribution analysis module 310 may perform one or more steps of process 800 in order to alert to model degradation.

In step 810, the distribution analysis module 310 may provide a customizable detection system to the end-user device 130. For example, the distribution analysis module 310 may provide an analytical model to an end-user device 130 associated with an entity, such as a financial institution. The analytical model may also include a customizable alerting system that provides feedback to the end-user device 130 during the operation of the model. The customizable alerting system may enable the end-user device 130 to provide a risk tolerance based on the analytical model that was received. In some examples the end-user device 130 may present options for risk tolerance ratings by a user. In other examples, the end-user device 130 may determine risk tolerance values based on the type of associated entity, entity guidelines, insurance requirements, etc.

In step 820, the distribution analysis module 310 may receive a risk tolerance from the end-user device 130. The risk tolerance may be a rating of the acceptable risk for an entity associated with the end-user device 130. For instance, some entities may have a higher tolerance when considering probability that an analytical model needs to be retrained based on deviation of model metrics. In some embodiments, the risk tolerance may be connected to a membership level or fee structure for end-users in relation to a service provider. Entities associated with higher risk models (e.g., models that detect fraudulent behavior or crime) may request or require lower risk tolerance than entities associated with lower risk models (e.g., models that detect consistency in employee or member data records).

In step 830, the distribution analysis module 310 is configured to calculate model metric thresholds based on the received risk tolerance. For example, if a risk tolerance value is low, indicating that the entity prefers more safeguards against the use of outdated models, the thresholds for metric deviation may be set to lower or within a narrower range. Conversely, if a risk tolerance is high because the entity is in a low risk or low priority position, the thresholds for metric deviation may be set to be higher or within a broader range. The metric thresholds may be calculated for a plurality of model metrics that are used to assess model health.

In step 840, the distribution analysis module 310 is configured to perform individual model monitoring for an analytical model. For example, the distribution analysis module 310 may be configured to perform steps of process 700 to compare model metrics to metric distributions for a given analytical model. The monitoring process may include comparing a deviation of a model metric to a threshold calculated in step 830. In this way, the distribution analysis module 310 is configured to determine when a deviation that matches a customized risk tolerance occurs during operation of a model. In some embodiments, the distribution analysis module 310 may calculate a model degradation equation that uses flagged "events" to assess model health based on a risk tolerance received in process 800. In step 850, the distribution analysis module 310 is configured to alert the end-user device 130 (or other component of service provider system 100) that an event has occurred (e.g., a model metric has deviated from a normal distribution mean by more than the threshold value).

The process 800 provides an additional process through which an analytical model assessment may be customized depending on various factors, including a risk tolerance value that identifies the importance of retraining the model before it has degraded to a certain extent.

Those of ordinary skill in the art will appreciate that the hardware required to run any of the systems and methods described herein may vary depending on the implementation. Other internal hardware or peripheral devices, such as flash memory, equivalent non-volatile memory, or optical disk drives may be used in addition to or in place of the hardware depicted. Moreover, any of the systems described herein can take the form of any of a number of different data processing systems, including but not limited to, client computing devices, server computing devices, tablet computers, laptop computers, telephone or other communication devices, personal digital assistants, and the like. Essentially, any of the systems described herein can be any known or later developed data processing system without architectural limitation.

The systems and methods of the figures are not exclusive. Other systems, and processes may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for alerting to analytical model degradation in a data processing system comprising a processing device and a memory comprising instructions which are executed by the processing device, the method comprising:
   selecting, by the processing device, model metrics for analysis, the model metrics being a measure of a parameter associated with a first analytical model;
   determining, by the processing device, normal distributions for model metric results for each of the selected model metrics, wherein each of the normal distributions comprises a plurality of values of model metrics, each of the plurality of values of model metrics from one of a plurality of analytical models, wherein the plurality of analytical models does not include the first analytical model;
   receiving model metric values of the first analytical model for each of the selected model metrics;
   comparing, by the processing device, the model metric values of the first analytical model to the normal distributions for model metric results for each of the received model metric values of the first analytical model; and
   alerting, by the processing device, to model degradation of the first analytical model based on the comparison of the model metric values of the first analytical model to the normal distributions for model metric results.

2. The method of claim 1, wherein the model metrics for analysis include one or more of sensitivity metrics, accuracy metrics, age metrics, or specificity metrics.

3. The method of claim 1, wherein determining the normal distributions for model metric results comprises obtaining the plurality of values of model metrics over a period of time and normalizing the plurality of values of model metrics to a distribution.

4. The method of claim 3, wherein the normal distribution for model metric results uses a threshold number of the plurality of values of model metrics based on a required sample size.

5. The method of claim 1, further comprising calculating, by the processing device, each of the model metric values of the first analytical model based on model output data received from an end-user device.

6. The method of claim 1, wherein comparing the model metric values of the first analytical model to the normal distributions of model metric results comprises comparing a deviation of the model metric value to a threshold value.

7. The method of claim 6, wherein the threshold value is a number of standard deviations of the normal distribution.

8. The method of claim 6, further comprising flagging an event when a deviation exceeds the threshold value.

9. The method of claim 8, wherein alerting to model degradation is based on an event equation that uses flagged events for each of the model metrics as input.

10. The method of claim 9, wherein the event equation compares a number of flagged events to a threshold value.

11. A detection modeling system comprising a processing device and a memory comprising instructions which are executed by the processing device for alerting to model degradation, the detection modeling system comprising a distribution analysis module configured to:
    select, by the processing device, model metrics for analysis, the model metrics being a measure of a parameter associated with a first analytical model;
    determine, by the processing device, normal distributions for model metric results for each of the selected model metrics, wherein each of the normal distributions comprises a plurality of values of model metrics, each of the plurality of values of model metrics from one of a plurality of analytical models, wherein the plurality of analytical models does not include the first analytical model;
    receive model metric values of the first analytical model for each of the selected model metrics;
    compare, by the processing device, the model metric values of the first analytical model to the normal distributions for model metric results for each of the received model metric values of the first analytical model; and
    alert, by the processing device, to model degradation of the first analytical model based on the comparison of the model metric values of the first analytical model to the normal distributions for model metric results.

12. The detection modeling system of claim 11, wherein the model metrics for analysis include one or more of sensitivity metrics, accuracy metrics, age metrics, or specificity metrics.

13. The detection modeling system of claim 11, wherein determining the normal distributions for model metric results comprises obtaining the plurality of values of model metrics over a period of time and normalizing the plurality of values of model metrics to a distribution.

14. The detection modeling system of claim 13, wherein the normal distribution for model metric results uses a threshold number of the plurality of values of model metrics based on a required sample size.

15. The detection modeling system of claim 11, further comprising calculating each of the model metric values of the first analytical model based on model output data received from an end-user device.

16. The detection modeling system of claim 11, wherein comparing the model metric values of the first analytical model to the normal distributions of model metric results comprises comparing a deviation of the model metric value to a threshold value.

17. The detection modeling system of claim 16, wherein the threshold value is a number of standard deviations of the normal distribution.

18. The detection modeling system of claim 16, further comprising flagging an event when a deviation exceeds the threshold value.

19. The detection modeling system of claim 18, wherein alerting to model degradation is based on an event equation that uses flagged events for each of the model metrics as input.

20. The detection modeling system of claim 19, wherein the event equation compares a number of flagged events to a threshold value.

21. A computer program product embodied in a computer readable storage medium comprising software that when executed by a processor performs a method comprising:

selecting, by a processing device, model metrics for analysis, the model metrics being a measure of a parameter associated with a first analytical model;

determining, by the processing device, normal distributions for model metric results for each of the selected model metrics, wherein each of the normal distributions comprises a plurality of values of model metrics, each of the plurality of values of model metrics from one of a plurality of analytical models, wherein the plurality of analytical models does not include the first analytical model;

receiving model metric values of the first analytical model for each of the selected model metrics;

comparing, by the processing device, the model metric values of the first analytical model to the normal distributions for model metric results for each of the received model metric values of the first analytical model; and alerting, by the processing device, to model degradation of the first analytical model based on the comparison of the model metric values of the first analytical model to the normal distributions for model metric results.

\* \* \* \* \*